Dec. 27, 1960 G. G. EMERSON ET AL 2,965,941
SAFETY SNUBBER
Filed March 31, 1958 2 Sheets-Sheet 1
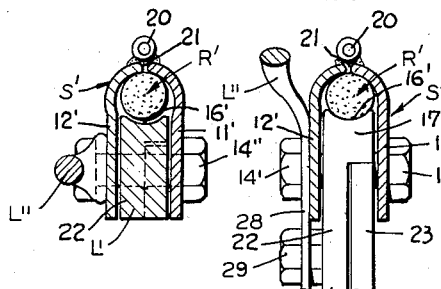
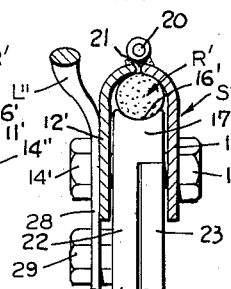
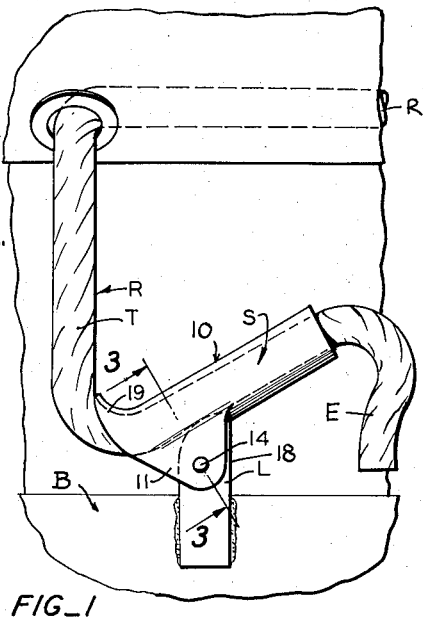
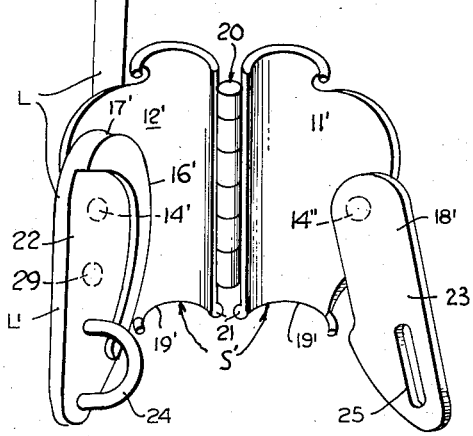
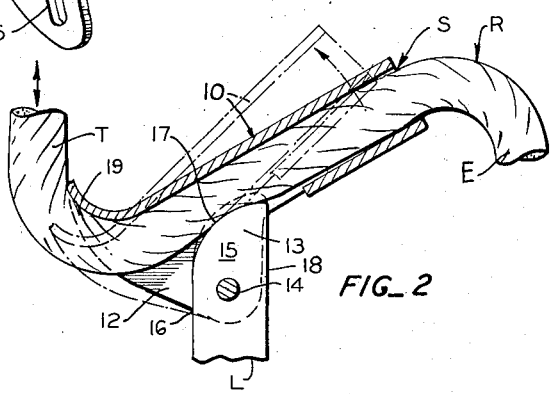
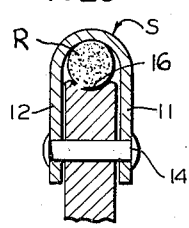
INVENTOR.
MERTON J. CARPENTER
GORDON G. EMERSON
and JOHN E. WALTON
BY Hansen and Lane
THEIR ATTORNEYS

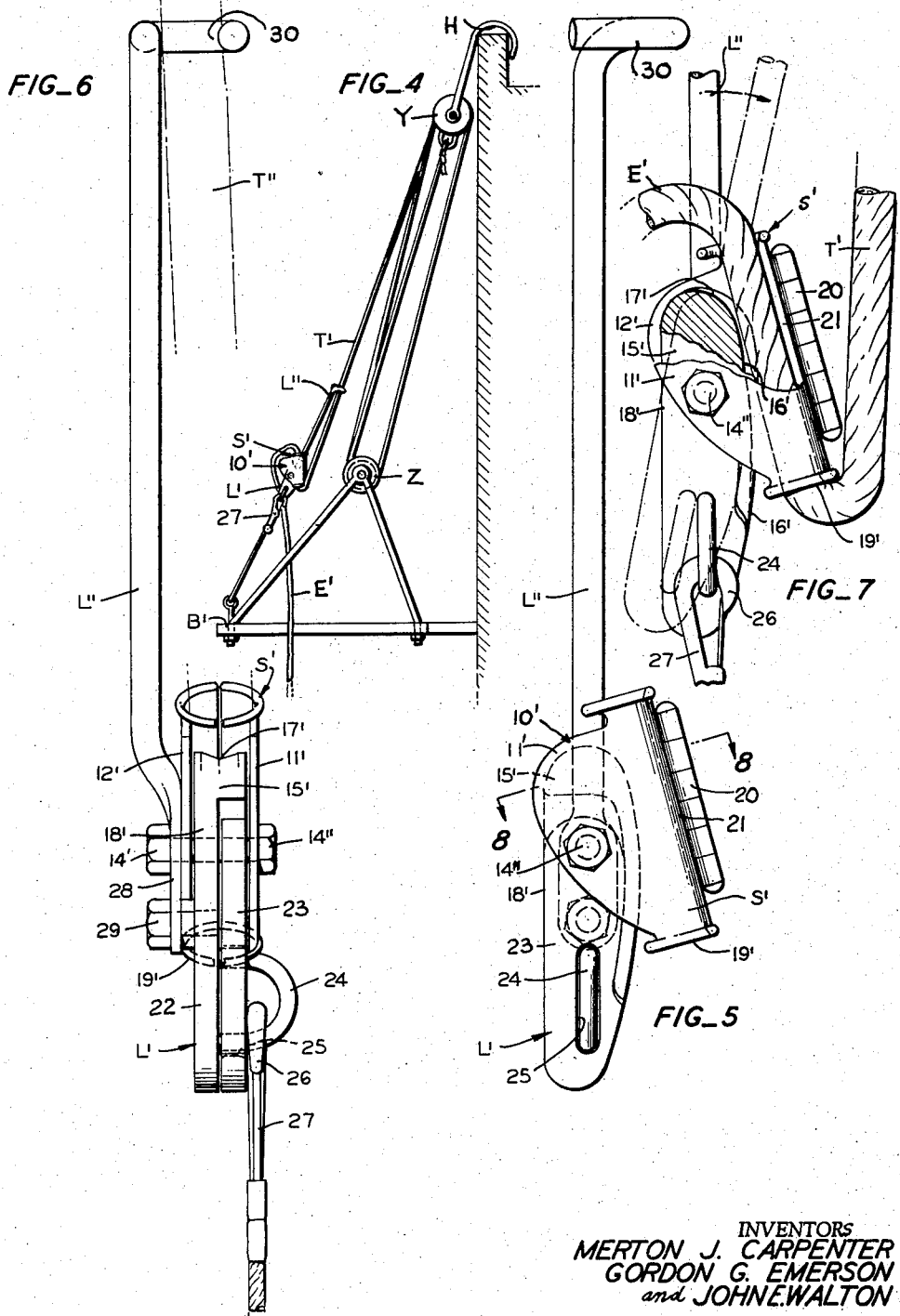

United States Patent Office 2,965,941
Patented Dec. 27, 1960

2,965,941
SAFETY SNUBBER

Gordon G. Emerson, 174 Beverly Court, Campbell, Calif.; John E. Walton, 16858 Roberts Road, Los Gatos, Calif.; and Merton J. Carpenter, San Jose, Calif.; said Merton J. Carpenter assignor to Edith A. M. Carpenter Filed Mar. 31, 1958, Ser. No. 725,138

6 Claims. (Cl. 24—133)

This invention relates to safety snubbers or binders for life lines, cables or ropes for the purpose of securing the same against slippage. More particulraly, this invention relates to a simple yet effective slip sleeve for a line coordinated with a lever and load in a manner to automatically secure the line within the slip sleeve.

It is one object of this invention to provide a guide or sleeve through which a cord, cable or rope may be strung and a lever pivotally mounted adjacent the sleeve having an eccentric cord engaging and disposed to normally allow slippage of the cord within the sleeve but so anchored relative to the line of resistance pull on the cable as to urge the section or segment of cord within the sleeve into binding engagement with the eccentric end of the lever.

The foregoing object and principle is equally applicable to use on the control cord or line of a swing stage or other such tautened rope for securing the same yet facilitating quick release thereof by manipulation of the lever relative to the guide sleeve.

Another object of this invention is to provide an openable sleeve adapted to receive a cord without requiring stringing of the cord into and through the sleeve.

These and other objects and advantages of the present invention will become apparent from a reading of the following description and specifications in the light of the drawings in which:

Fig. 1 is a side view of a snubber unit embodying the present invention in use.

Fig. 2 is an enlarged, detailed, longitudinal section through the unit of Fig. 1.

Fig. 3 is an enlarged transverse section through the unit shown in Fig. 1 and taken substantially along line 3—3 thereof.

Fig. 4 is a side elevational view of a more elaborate form of the present invention shown in use on a swing stage.

Fig. 5 is an enlarged side elevational view of the unit only as shown in Fig. 4.

Fig. 6 is a front elevation of the unit of Fig. 4 as seen from the left in Fig. 5.

Fig. 7 is a fragmentary detail of the unit of Fig. 5 with parts broken away to illustrate the same.

Fig. 8 is a transverse section through Fig. 5 as seen from line 8—8 therein.

Fig. 9 is a transverse section similar to that of Fig. 8 with parts thereof in cord binding relation.

Fig. 10 is a front perspective view of the snubber unit of Fig. 6 in open condition.

The snubber unit 10 of the present invention is shown in its simplest form in Figs. 1, 2 and 3. It comprises a sleeve S through which a flexible cord, cable or rope R can be strung for sliding movement and a lever L pivotally mounted adjacent an open side of the sleeve so that the lever can swing about an axis transverse and offset relative to the axis of the sleeve S for engaging or disengaging the rope R.

More specifically, the sleeve S is open along one side which open side is straddled by parallel ears 11—12 to expose the rope within the sleeve to one end 13 of the lever L. The ears 11 and 12 are drilled to receive a pin 14 which also extends through the head end 15 of the lever L which is embraced by the ears 11 and 12. The pivot pin 14 extends through the longitudinal center of the lever L and the pin is offset relative to the sleeve S so that when the lever extends substantially parallel to the sleeve the sleeve side 16 of the lever does not extend into the sleeve. The free end 13 of the lever extends a greater distance from the pivot pin 14 than does the side 16 of the lever and is arcuate in shape as at 17 so as to cammingly engage the rope R in the sleeve when the long axis of the lever is moved toward a position in which it is transverse to the long axis of the sleeve. Note in Fig. 2 that the arc 17 is struck on a radius which is centered adjacent the edge 18 of the head 15 which edge 18 is opposite to the edge 16 thereof. Moreover, the arc 17 merges with the edge 16 and therefore becomes more eccentric to the pivot pin 14 as it approaches the free end 13 of the head 15 of lever L. In addition to the foregoing the arcuate edge 17 is grooved transversely (see Fig. 3) so as to receive the round cable or rope R within the sleeve.

In the form shown in Figs. 1 and 2 the rope R is assumed to come from above where it is engaged by a load or the thing to be secured. In Fig. 1 I have shown the rope R as coming from a grommet in a tarpaulin covering an object supported on a bed B to which the lever L is secured. While I have shown lever L welded to the bed B, it should be apparent that it might be bolted thereto or releasably secured by means of a conventional hook and eye connection if desired. In principle it need only be said that the lever L is anchored to some object fixed relative to the load with which the rope is associated, whereas the rope R is adapted to be pulled and/or drawn tightly toward the anchorage for the lever L. The tautened section T of rope R terminates at one end of the sleeve S, that end of the sleeve which is remote from the load, the left end as seen in Figs. 1 and 2, and the loose end E of the rope drapes freely from the opposite end of the sleeve. In Figs. 1 and 2 the lever L is disposed with its longitudinal axis substantially parallel to that portion of the rope coming from the load. The sleeve S is therefore adapted to swing relative to the pivot pin 14 and is normally caused to urge the section of rope within the sleeve toward the arcuate end 17 of the lever by the upward pull or resistance exerted on the tautened section T of rope R by the load. To facilitate the ease of movement of the rope into the sleeve the entrance end 19 of the latter is flared or belled. In this manner the tautened section T of the rope can be drawn tightly down and readily slip into the sleeve when the loose end of the rope is pulled.

As previously mentioned the rope is free to slip within the sleeve only when the latter is parallel or near parallel to the long axis of the lever L. Consequently, the resistance of the load to the pull on the tautened section T of the rope rocks the sleeve S in a direction to cause that section of rope within the sleeve to bindingly engage against the eccentric or arcuate end 17 of lever L. In this manner, backward slippage of the rope within the sleeve is resisted and all the more as the tautened section T of the rope is drawn tighter relative to the load. The action is like a one-way valve. The rope can be pulled through the sleeve in one direction but when the tautened section T of the rope exerts its resisting force the sleeve is rocked in such a manner that, relatively speaking, the arcuate end 17 of the lever enters the sleeve and bindingly engages or snubs the rope so as to prevent backward slippage thereof.

The same principle of operation is afforded in the form of the invention shown in Figs. 4 through 9. In these views parts which are common to those in the form of Figs. 1, 2 and 3 will be designated by like reference numerals and/or letters which are distinguished by a prime exponent.

Referring to Fig. 4 it will be noted that the snubber unit is employed in a different manner. In Fig. 4 the unit 10' is used as a safety snubber for swing stage rigging. In this arrangement the rope R to be tautened and secured is the manipulatable end T' of a rope strung through a set of blocks Z and Y. The block and tackle arrangement is old and well known. The lower block Z is connected to the stage itself while upper block Y is anchored by a hook H over the parapet wall of a building in a conventional manner. Heretofore it was customary for the person on the stage to snub the tautened section T' of the rope R' through some eye or round on the platform of the stage. The person on the stage had to use great care to hold the taut rope T' and tie it securely when the stage was to be set at a desired elevation. With the unit 10' embodying the present invention, the snubbing and securing of the tautened rope T' is safer and more easily handled.

As in the case of the simplest form of the invention already explained, the tautened rope T' is strung through the sleeve S' for relative slippage, the rope entering that end 19' of the sleeve which is remote from the load on the tautened section T' of the rope. Since this end T' of the rope might be of considerable length, it would be most inconvenient for the person on the stage to have to string several hundred feet of heavy hemp rope through the sleeve S'. To alleviate this difficulty, the sleeve S' is constructed so as to open up like a book. That is to say, the sleeve S' is split lengthwise to provide two halves 11' and 12' hingedly joined as at 20 along that edge 21 thereof which is remote from the lever L'. The two halves 11' and 12' as best seen in Figs. 8 and 9 have a U-shaped cross section so that the legs of the U shape provide the necessary ears between which the head portion 15' of the lever can be received. In order to secure these two halves 11' and 12' together during use of the unit the head portion 15' of the lever is likewise split to provide a main head portion 22 and an auxiliary head portion 23 which fit together when the hinged halves of the sleeve are closed.

The main portion 22 of the head 15' is pivotally connected to the ear portion of sleeve half 12' while the auxiliary portion 23 of the head 15' is pivotally connected to the ear portion of the sleeve half 11'. This is clearly illustrated in Fig. 7. When the main and auxiliary portions 22 and 23 lie side by side as seen in Figs. 6 and 8 the entire head portion 15' is pivoted as a unit on pins 14'—14" which are axially aligned, the pin 14' connecting the main portion 22 to the ear portion 12' and the pin 14" connecting the auxiliary portion 23 to the ear portion 11'.

In order to eliminate the cutting, binding or abrading effect of the split head portion against that section of the rope R' within the sleeve S', the main portion 22 has a bearing surface 16' which is the full thickness of the head portion, i.e., the full width of the space between the ears 11'—12'. This surface 16' is recessed or contoured to form one arcuate side of the sleeve S' and to fit against the rope R' therein. The upper extremity 17' of the head portion 15 is arcuate and eccentric to the pivot pin 14' as previously explained in connection with the form shown in Figs. 1, 2 and 3.

The main portion 22 of the head 15' is provided with a staple 24 which has its ends secured to the lever L' so as to extend therefrom toward the auxiliary portion 23 of the head. The auxiliary portion 23 of the head 15' has a slot 25 formed therethrough for receiving the staple 24 when the hinged halves 11 and 12 of the sleeve 15' are closed upon each other to envelope the rope R'. This constitutes a hasp-like arrangement adapted to be secured by the hook end 26 of a snap hook 27. The snap hook 27 also constitutes an anchorage for the unit 10' for relatively securing the same in a fixed position in a manner comparable to the anchorage of the lever L to the base B in Figs. 1 and 2 previously explained. In Fig. 4 the hook 27 is shown anchored to the swing stage B'. It will thus be seen that the upward pull or resistance afforded by the tautened section T' of rope R' causes the sleeve S' to be rocked about pivot pins 14'—14" to press the section of rope within the sleeve against the eccentric end 17' of the lever L. Thus the rope R' is snubbed against slippage through the sleeve S'.

The safety snubber 10' has another feature not shown in connection with the simplest form shown in Figs. 1 and 2. This feature includes handle L" which is an extension of the level L' itself. This handle L" may be formed integrally with the lever L' or may be secured thereto as best seen in Fig. 6. In this view it will be noted that the handle L" has a flattened end 28 disposed to receive the shank of pin 14' as well as the shank of a bolt 29 spaced from the pin 14' and threaded into the main portion 22 of the split head 15' as shown in Figs. 6 and 7. Thus it will be seen that the handle L" swings in unison with the head portion 15' about the pivot pin 14'.

The upper end of lever L" is provided with a lateral hook 30 so disposed as to hook onto the tensioned strand T' of the rope by which the swing stage rigging is controlled. In this manner the snap hook 27, lever L' and handle L" are aligned between the point of anchorage of the snap hook 27 to the base B' and the point of connection of the hooked end 30 of the handle L" to the tautened section T' of the rope R'. The sleeve S' is therefore free to swing about pivot pins 14'—14" under the influence of the upward resistance to pull upon the tautened section T' of rope R'. Since the tautened section T' of rope R' enters the lower open end 19' of sleeve S' the latter is influenced to swing in a direction counterclockwise as seen in Figs. 1 and 5, to urge the strand of rope within the sleeve toward the eccentric end 17' on the head portion 15" of lever L'. In this manner the cam-like end 17' in effect enters the sleeve to bindingly engage the rope R' and snubs the same against backward slippage through the sleeve S'.

As previously explained in connection with Figs. 1, 2 and 3, the harder the tautened section of the rope is pulled, the greater the bearing force of the eccentric end 17' of the lever L' against the section of rope within the sleeve S'. This is effected only when the lever L' is disposed in substantial parallelism with respect to the line of force on or the disposition of the tautened section T' of the rope. In the application of the present invention as delineated in Figs. 4 through 7, the lever L' normally tends to remain in such parallel or near parallel disposition with respect to the section T' of the rope. This is further effected by reason of the anchor or hooked relation of the upper end of the handle L" to the tautened section T' of the rope. When the hooked end 30 of handle L" is disconnected from section T' of the rope, the head portion 15" of lever L' will in effect tend to pivot around the eye of snap hook 27 but the bearing relation between the cam-like end 17' of the head 15' and the rope will still persist. With the handle thus disconnected from the strand T' the person on the stage can manipulate the handle L" and thus the lever L' (counterclockwise Fig. 4) to bring the sleeve S' toward alignment with the strand T' of the rope. This, in effect, relieves the snubbing action upon the rope at the end 19' of the sleeve S' and also tends to urge the cam-like upper end 17' away from the rope so that slippage can occur. This slippage of the rope relative to sleeve S' can be controlled by the manipulation of the handle L" so that the pressure of the cam end 17' of the lever against the rope within the sleeve can be increased or decreased by degrees. Thus the speed at which the rope will pay through sleeve S' is under complete control of the man on the stage. Once the stage has been lowered to the elevation desired, the handle L" can again be released whereupon the rope will be snubbed or secured automatically. To assure against accident or faulty movement of the handle, the hooked end 30 of the latter can again be secured to tautened section T' of the rope.

While we have described the principle and operation of our new safety snubber in specific detail, it will be understood by those skilled in the art that the structure is susceptible to alteration, variation and/or modification without departing from the spirit of our invention. We, therefore, desire to avail ourselves of all variations, modifications and/or alterations as fairly come within the purview of the appended claims.

What we claim as new and desire to protect by Letters Patent is:

1. A device for snubbing a tautened rope or the like drawn toward a load comprising a lever having a head portion, a sleeve adapted to have said tautened rope therein for guidance thereby, said tautened section of said rope entering that end of said sleeve which is remote from the load, said sleeve being split lengthwise and hinged along one side for receiving said tautened rope therebetween when said sleeve halves are opened relative to each other, each said sleeve half having an ear portion extending therefrom opposite the hinged side thereof, said head portion of said lever being divided into interfitting main and auxiliary head portions, means for pivotally connecting said main head portion of said lever to one of said ears in offset relation to the axis of said sleeve, said main head portion having a rope engaging edge and cam-like tip the full width of said main head portion being disposed to engage that section of said tautened rope which is within said sleeve, means for pivotally connecting said auxiliary head portion to the other one of said ears on an axis common to the means pivotally connecting said main head portion to said one of said ears, a hasp arrangement between said main and auxiliary head portions for interconnecting them for swinging movement in unison relative to said ears, and a hook anchored to a stationary object away from which said tautened rope is being pulled by its load, said hook being connectible to said hasp arrangement for securing said hinged sleeve halves in closed condition upon said tautened rope and for anchoring said levers whereby said tautened rope effects a pull upon that end of said closed sleeve remote from the load to urge that section of said rope within said sleeve into binding relation with the cam-like tip on the main head portion of said lever.

2. A device for snubbing a tautened rope or the like drawn toward a load comprising a lever having a head portion, a sleeve adapted to have said tautened rope therein for guidance thereby, said sleeve being split lengthwise and hinged along one side for receiving said tautened rope therebetween when said sleeve halves are opened relative to each other, said tautened rope entering said sleeve at that end thereof which is remote from the load, each said sleeve half having an ear portion extending therefrom opposite the hinged side thereof, said head portion of said lever being divided into interfitting main and auxiliary head portions, means for pivotally connecting said main head portion of said lever to one of said ears in offset relation to the axis of said sleeve, said main head portion having a rope engaging edge and cam-like tip the full width of said main head portion and so disposed as to engage that section of said tautened rope which is within said sleeve, means for pivotally connecting said auxiliary head portion to the other one of said ears on an axis common to the means pivotally connecting said main head portion to said one of said ears, a hasp arrangement between said main and auxiliary head portions for interconnecting them for swinging movement in unison relative to said ears, a hook anchored to a stationary object remote from the load toward which said tautened rope is being pulled, said hook being connectible to said hasp arrangement for securing said hinged sleeve halves in closed condition upon said tautened rope whereby the pull effected by said tautened rope upon that end of said closed sleeve which is remote from the load rocks said sleeve relative to said levers to urge that section of said rope within said sleeve into binding relation with the cam-like tip on the head portion of said lever, and a handle secured to the hasp end of said main head portion and extending upwardly therefrom diametrically of the means for pivotally connecting the latter to said one ear to thereby dispose said handle adjacent the tautened rope for rendering said handle manipulatable from above said sleeve to swing that end of said sleeve remote from the load toward alignment with the line of pull along said tautened rope, and a hook on the free end of said handle disposed to engage said tautened rope for maintaining said sleeve remote from the load in snubbing relation to said rope.

3. A device for snubbing a tautened rope or the like comprising a lever having one end adapted to be anchored to a stationary object away from the load by which said tautened rope is being pulled, a sleeve adapted to have said tautened rope arranged for sliding movement therein, the tautened section of said rope entering that end of said sleeve which is remote from the load, said sleeve being split lengthwise to provide sleeve halves, means for hingedly connecting said sleeve halves along one side thereof for opening said sleeve to receive said tautened rope therein, each said sleeve half having an ear portion extending therefrom opposite said hinge means for embracing the opposite end of said lever, means for pivotally connecting said opposite end of said lever to one of said ears in offset relation to the axis of said sleeve whereby the pull on said tautened rope exerted on that end of said sleeve which is remote from the load urges that section of said rope within said sleeve into binding relation with the said opposite end of said lever, and means for securing said sleeve halves in closed condition upon said rope comprising an auxiliary half lever for said lever and pivoted to the other one of said ears for swinging movement coaxially with said lever, and means anchored to said stationary object for releasably connecting said auxiliary half lever to said lever for swinging movement therewith and for simultaneously securing said sleeve halves in closed condition upon said rope and anchoring said lever to said stationary object.

4. A device for snubbing a tautened rope or the like comprising a lever having one end adapted to be anchored to a stationary object remote from the load by which said tautened rope is being pulled, a sleeve adapted to have said tautened rope arranged for sliding movement therein and entering that end of said sleeve which is remote from the load, said sleeve being split lengthwise to provide sleeve halves, means for hingedly connecting said sleeve halves along one side thereof for opening said sleeve to receive said tautened rope therein, each said sleeve half having an ear portion extending therefrom opposite said hinge means for embracing the opposite head end of said lever, means for pivotally connecting the head end of said lever to one of said ears in offset relation to the axis of said sleeve whereby a pull upon that end of said sleeve remote from the load by said tautened rope urges that section of said rope within said sleeve into binding relation with the head end of said lever, and means for securing said sleeve halves in closed condition upon said rope comprising an auxiliary half lever interfittingly connectable to said lever and pivoted to the other one of said ears for swinging movement coaxially with said lever, means connected to said stationary object for releasably connecting said auxiliary half lever to said lever for swinging movement therewith and for securing said sleeve halves in closed condition upon said rope while anchoring said lever to said stationary object, and a handle secured to said lever for rendering the same manipulatable to swing that end of said sleeve remote from the load toward alignment with the line of pull along said tautened rope.

5. A device for snubbing a tautened rope or the like drawn toward a load comprising a lever having a head end and an opposite end, a linkage connecting said opposite end of said lever to a stationary anchorage remote from which said tautened rope is being pulled by its load, an open sided sleeve adapted to lie substantially parallel to said lever and having a pair of ears straddling the open side of said sleeve to receive the head end of said lever, means for pivotally connecting the head end of said lever to said ears in offset relation to the axis of said sleeve, the head end of said lever having an upper edge eccentric to said pivot means, said tautened rope being strung through that end of said sleeve which is remote from the load whereby to exert a pull upon that end of said sleeve which is remote from the load to urge that section of said rope within said sleeve into binding relation with the upper edge of the head end of said anchored lever, and a handle pivotally mounted exteriorly of and on one of said ears concentric to said lever and having one end secured to said lever diametrically opposite the head end thereof for manually moving the same against the action of said anchor linkage on said lever into a position to thereby tilt said sleeve in a direction to align that end of said sleeve remote from the load with the line of force exerted in said tautened rope.

6. A device for snubbing a tautened rope or the like comprising a lever having a head end and an opposite end, a linkage connecting the opposite end of said lever to a stationary object away from which said tautened rope is being pulled, an open sided sleeve adapted to lie substantially parallel to said tautened rope having said tautened rope strung therethrough from that end of said sleeve which is remote from the load, means for pivotally connecting the head end of said lever in offset relation to the axis of said sleeve whereby a pull upon that end of said sleeve remote from the load by said tautened rope urges that section of said rope within said sleeve into binding relation with the head end of said anchored lever, and a handle for rocking said lever and sleeve into a position wherein that end of said sleeve remote from the load approaches alignment with the line of force within said tautened rope to effect controlled slippage of said rope through said sleeve, said handle being connected to that portion of said lever adjacent its anchored end and extending diametrically beyond the means for pivotally connecting the head end of said lever to said sleeve to dispose the free end of said handle adjacent said tautened rope, and a hook formed on the free end of said handle engageable with said tautened rope.

References Cited in the file of this patent

UNITED STATES PATENTS

| | | |
|---|---|---|
| 483,299 | Cadwell | Sept. 27, 1892 |
| 733,458 | Cockerell | July 14, 1903 |
| 1,298,614 | Whitkanack | Mar. 25, 1919 |
| 1,496,568 | Vanderdonck | June 3, 1924 |
| 1,705,523 | Hofbauer | Mar. 19, 1929 |
| 1,898,677 | Malone | Feb. 21, 1933 |
| 2,215,139 | Uhlmann | Sept. 17, 1940 |

FOREIGN PATENTS

| | | |
|---|---|---|
| 1,076,672 | France | Apr. 21, 1954 |